US012619382B2

(12) United States Patent
Kim et al.

(10) Patent No.: US 12,619,382 B2
(45) Date of Patent: May 5, 2026

(54) MEMORY CONTROLLER AND STORAGE DEVICE INCLUDING THE SAME

(71) Applicant: SK hynix Inc., Gyeonggi-do (KR)

(72) Inventors: Geon Woo Kim, Gyeonggi-do (KR); Dae Hoon Jang, Gyeonggi-do (KR); Jhu Yeong Jhin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 311 days.

(21) Appl. No.: 18/353,117

(22) Filed: Jul. 17, 2023

(65) Prior Publication Data

US 2024/0241669 A1     Jul. 18, 2024

(30) Foreign Application Priority Data

Jan. 12, 2023    (KR) ........................ 10-2023-0004815

(51) Int. Cl.
  *G06F 3/06*        (2006.01)
  *G06F 12/02*       (2006.01)
(52) U.S. Cl.
  CPC .......... *G06F 3/0659* (2013.01); *G06F 3/0611* (2013.01); *G06F 3/0656* (2013.01); *G06F 3/0679* (2013.01); *G06F 12/0292* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 8,024,517 B2 * | 9/2011 | LaFrese | .............. | G06F 12/0804 |
| | | | | 711/112 |
| 2019/0087332 A1 * | 3/2019 | Jun | ........................ | G06F 3/0611 |

FOREIGN PATENT DOCUMENTS

| | | |
|---|---|---|
| KR | 10-2019-0066466 A | 6/2019 |
| KR | 10-2021-0026103 A | 3/2021 |

* cited by examiner

*Primary Examiner* — Gary W. Cygiel
(74) *Attorney, Agent, or Firm* — IP & T GROUP LLP

(57) ABSTRACT
A memory controller that includes a buffer memory configured to store user data and a write command corresponding to a write request received from a host, a processor configured to control a memory device to perform a write operation, and a host interface configured to determine an active range based on mapping information of the memory device, determine the throttle trigger value based on the active range, determine a base latency based on a write ratio of the write command to commands received from the host, and determine a delay time of a write completion response based on the throttle trigger value and the base latency, delay the write completion response according to the delay time, and transmit the delayed write completion response to the host.

19 Claims, 7 Drawing Sheets

MEMORY CONTROLLER AND STORAGE DEVICE INCLUDING THE SAME

CROSS-REFERENCE TO RELATED APPLICATION

The present application claims priority under 35 U.S.C. § 119(a) to Korean patent application number 10-2023-0004815 filed on Jan. 12, 2023, the entire disclosure of which is incorporated by reference herein.

BACKGROUND

1. Field of Invention

Embodiments of the present disclosure relate to an electronic device, and more particularly, to a storage device including a memory device and a memory controller.

2. Description of Related Art

In a storage device, quality of service (QOS) is an item indicating how uniformly each command is processed, and is measured based on command latency. In the past, only throughput, which means an amount of data processed per unit time, was a main factor in evaluating performance of a storage device. However, in the latest server environment, while requiring high throughput, quality of service (for example, command latency) felt by a user is also considered a main factor in evaluating the performance of the storage device.

When a host transfers a command at a speed equal to or greater than a processing speed of the storage device, the number of commands that may be simultaneously processed in the storage device may be exceeded. At this time, a phenomenon in which QoS is reduced while latency increases instantaneously may occur. In order to prevent QoS from rapidly being reduced, the storage device may use a throttling technique for delaying the command transferred and received from the host.

However, since the throttling technique secures QoS through the delay of the command received from the host and uses a fixed processing function, optimized latency, that is, optimal QoS may not be guaranteed.

SUMMARY

An embodiment of the present disclosure provides a memory controller supporting an improved throttling technique and a method of operating a storage device including the same.

According to an embodiment of the present disclosure, a memory controller may include a buffer memory configured to store user data and a write command corresponding to a write request received from a host, a processor configured to control a memory device to perform a write operation, and a host interface configured to determine an active range based on mapping information of the memory device, determine the throttle trigger value based on the active range, determine a base latency based on a write ratio of the write command to commands received from the host, and determine a delay time of a write completion response based on the throttle trigger value and the base latency, delay the write completion response according to the delay time, and transmit the delayed write completion response to the host.

According to an embodiment of the present disclosure, a storage device may include a memory device including a plurality of memory blocks, a buffer memory configured to store user data and a write command corresponding to a write request received from a host, and a memory controller configured to control the memory device to perform a write operation corresponding to the write command, determine an active range based on mapping data, determine the throttle trigger value based on the active range, determine a base latency based on a write ratio of the write command to commands received from the host, determine a delay time of a write completion response based on the throttle trigger value and the base latency, delay the write completion response according to the delay time, and transmit the delayed write completion response to the host.

According to an embodiment of the present disclosure, a storage device may include a memory device, and a memory controller including a buffer memory and configured to perform a write operation on the memory device in response to a write request from a host, and transmit, to the host, a write completion response responsive to the write request at a particular time. The particular time may be determined based on a throttle trigger value and a base latency. The throttle trigger value may be determined based on an active range with reference to mapping data associated with the write operation. The base latency may be determined based on a write ratio of the write command to commands received from the host.

According to the present technology, a memory controller supporting an improved throttling technique and a method of operating a storage device including the same are provided.

DETAILED DESCRIPTION

Specific structural or functional descriptions of embodiments according to the concept of the present disclosure disclosed in the present specification are illustrated only to describe the embodiments according to the concept of the present disclosure. The embodiments according to the concept of the present disclosure may be carried out in various forms and are not limited to the embodiments described in the present specification.

Figure 1:
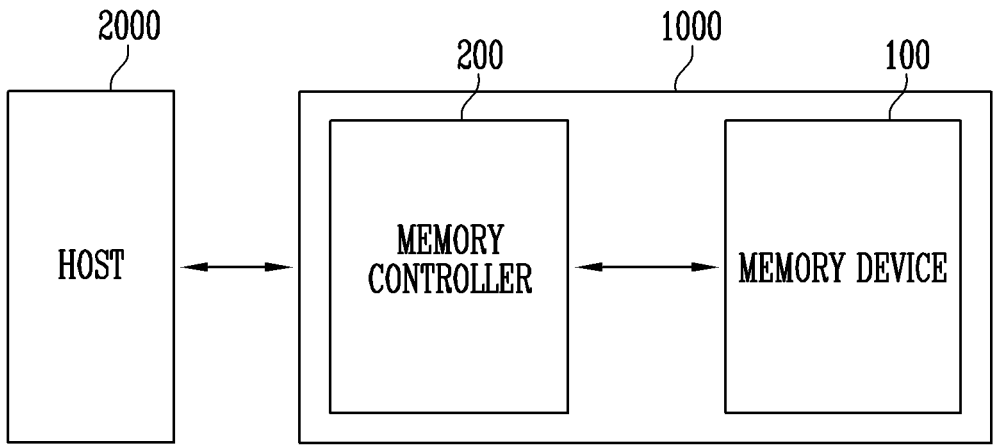
FIG. 1 is a diagram illustrating a storage device according to an embodiment of the present disclosure.

FIG. 1 is a diagram illustrating a storage device 1000 according to an embodiment of the present disclosure.

Referring to FIG. 1, the storage device 1000 may include a memory device 100 and a memory controller 200.

The storage device 1000 may store data under control of a host 2000 such as a cellular phone, a smartphone, an MP3 player, a laptop computer, a desktop computer, a game player, a display device, a tablet PC, or an in-vehicle infotainment system.

The storage device 1000 may be implemented as one of various types of storage devices according to a host interface that is a communication method with the host 2000. For example, the storage device 1000 may be implemented as any of various types of storage devices such as an SSD, a multimedia card in a form of an MMC, an eMMC, an RS-MMC and a micro-MMC, a secure digital card in a form of an SD, a mini-SD, and a micro-SD, a universal serial bus (USB) storage device, a universal flash storage (UFS) device, a personal computer memory card international association (PCMCIA) card type of storage device, a peripheral component interconnection (PCI) card type of storage device, a PCI express (PCI-e or PCIe) card type of storage device, a compact flash (CF) card, a smart media card, and a memory stick.

The storage device 1000 may be implemented as any of various types of packages. For example, the storage device 1000 may be implemented as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data or use the stored data. Specifically, the memory device 100 may operate in response to control of the memory controller 200. In addition, the memory device 100 may include a plurality of memory dies, and each of the plurality of memory dies may include a memory cell array including a plurality of memory cells storing data.

Each of the memory cells may be configured as a single level cell (SLC) that stores one bit of data, a multi-level cell (MLC) that stores two bits of data, a triple level cell (TLC) that stores three bits of data, or a quad level cell (QLC) that stores four bits of data.

The memory cell array may include a plurality of memory blocks. Each memory block may include a plurality of memory cells, and one memory block may include a plurality of pages. Here, a page may be one unit for storing data in the memory device 100 or reading the data stored in the memory device 100.

The memory device 100 may be implemented as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 may receive a command and an address from the memory controller 200. The memory device 100 may be configured to access an area selected by the received address in the memory cell array. Accessing the selected area may mean performing an operation corresponding to the received command on the selected area. For example, the memory device 100 may perform a write operation (a program operation), a read operation, and an erase operation. The program operation may be an operation in which the memory device 100 writes data to the area selected by the address. The read operation may mean an operation in which the memory device 100 reads data from the area selected by the address. The erase operation may mean an operation in which the memory device 100 erases data stored in the area selected by the address.

The memory controller 200 may control an overall operation of the storage device 1000. Specifically, the memory controller 200 may execute firmware (FW) when power is applied to the storage device 1000. The firmware (FW) may include a host interface layer (HIL) that receives a request input from the host 2000 or outputs a response to the host 2000, a flash translation layer (FTL) that manages an operation between an interface of the host 2000 and an interface of the memory device 100, and a flash interface layer (FIL) that provides a command to the memory device 100 or receives a response from the memory device 100.

The memory controller 200 may receive data and a logical address (LA) from the host 2000, and map the LA into a physical address (PA) indicating an address of memory cells in which data included in the memory device 100 is to be stored. The LA may be a logical block address (LBA), and the PA may be a physical block address (PBA).

The memory controller 200 may control the memory device 100 to perform the program operation, the read operation, the erase operation, or the like according to a request of the host 2000. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

The memory controller 200 may control the memory device 100 to perform the program operation, the read operation, or the erase operation by itself regardless of the request from the host 2000. For example, the memory controller 200 may control the memory device 100 to perform the program operation, the read operation, or the erase operation used to perform a background operation such as wear leveling, garbage collection, and read reclaim.

The host 2000 may communicate with the storage device 1000 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
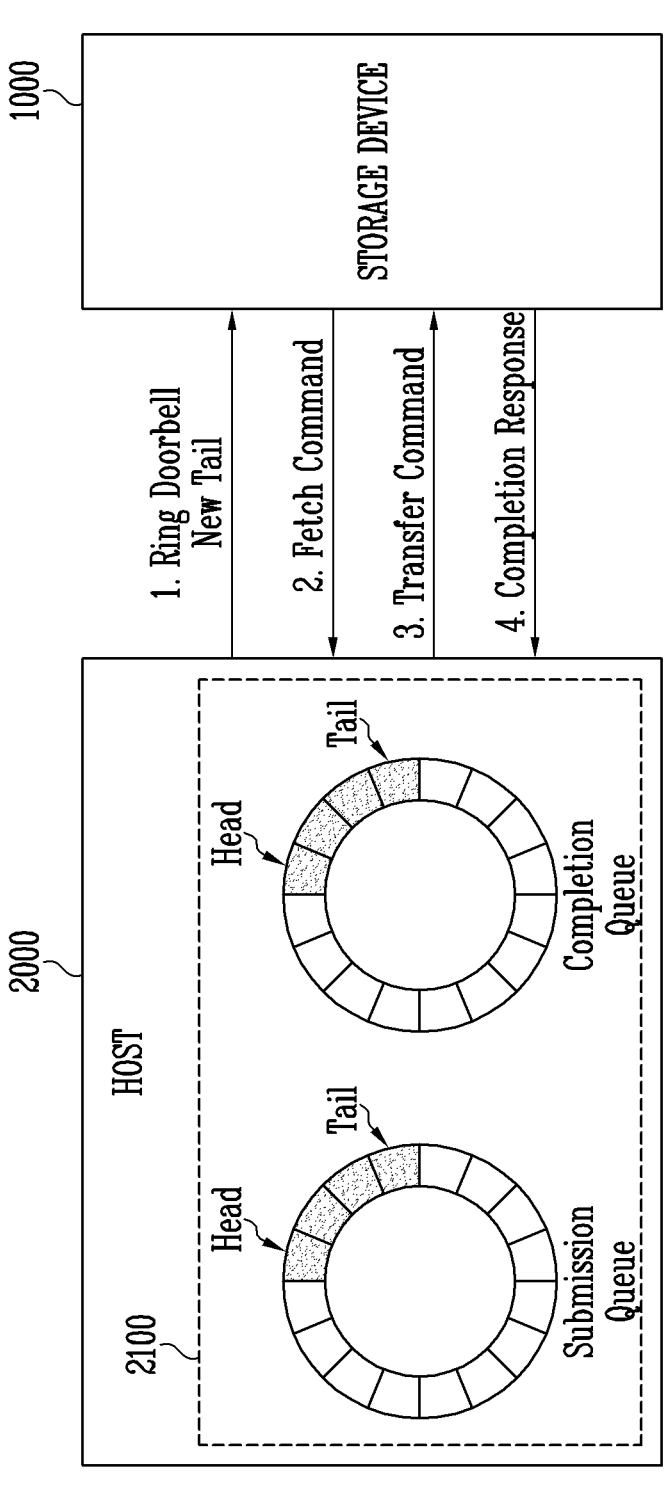
FIG. 2 is a diagram illustrating a command interface operation according to an embodiment of the present disclosure.

FIG. 2 is a diagram illustrating a command interface operation according to an embodiment of the present disclosure.

Referring to FIG. 2, the storage device 1000 and the host 2000 perform a command interface operation.

The host 2000 may generate a queue pair including a submission queue and a completion queue. When the host 2000 includes a plurality of cores, the submission queue and the completion queue may be a queue pair generated in correspondence with one core among the plurality of cores. According to an embodiment, the queue pair may be stored in a host memory 2100.

The storage device 1000 may include a doorbell register to perform a command queue interface operation. The storage device 1000 may use a host interface 270 (refer to FIG. 3) based on a doorbell that allows the host 2000 to dispose a descriptor in a memory ring for the storage device 1000 and issue a pointer update write request to the storage device 1000. In an embodiment, the pointer update write request may be referred to as a 'doorbell'. The storage device 1000 may store, in a doorbell register, information on the queue pair generated by the host 2000. When the plurality of cores exist in the host 2000, the same number of doorbell registers as the number of cores may be included in the storage device 1000. The doorbell register may store a submission queue tail pointer pointing to a tail of the submission queue and a completion queue head pointer pointing to a head of the completion queue. The storage device 1000 may perform the command queue interface operation with the host 2000 by accessing the submission queue and the completion queue with reference to the doorbell register.

The host 2000 may queue a command in the submission queue to provide the command to the storage device 1000. In addition, the host 2000 may update the submission queue tail pointer and provide, to the storage device 1000, information on the updated submission queue tail pointer. The storage device 1000 may store the updated submission queue tail pointer in the doorbell register.

In addition, the storage device 1000 may fetch the command stored in the submission queue. When the command is transmitted from the host 2000 to the storage device 1000, the storage device 1000 may process the command received from the host 2000.

The storage device 1000 may provide a completion response by recording that processing of the command is completed in the completion queue after processing the command. For example, the storage device 1000 may write a completion queue entry to the completion queue. At this time, the completion queue head pointer may increase.

In addition, the host 2000 may complete the corresponding command. The host 2000 may provide the updated completion queue head pointer to the storage device 1000. For example, the storage device 1000 may store the updated completion queue head pointer in the doorbell register.

Figure 3:
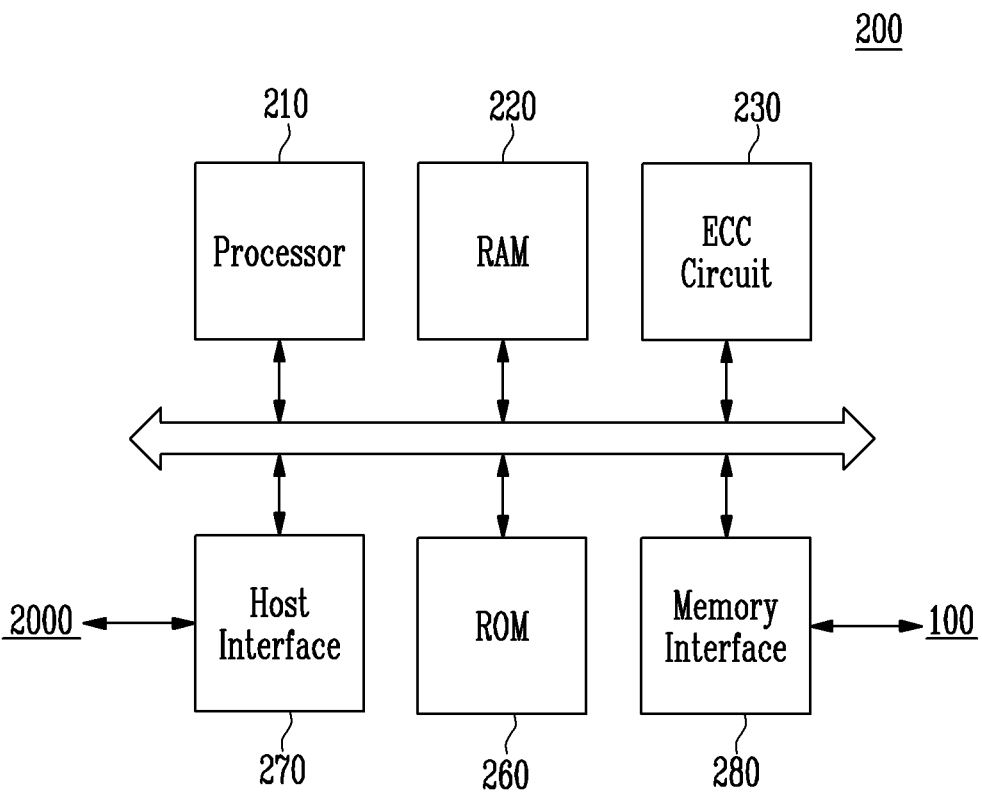
FIG. 3 is a diagram illustrating a memory controller according to an embodiment of the disclosure.

FIG. 3 is a diagram illustrating a memory controller 200 according to an embodiment of the disclosure.

Referring to FIG. 3, the memory controller 200 may include a processor 210, a random access memory (RAM) 220, an error correction circuit (ECC circuit) 230, a read only memory (ROM) 260, a host interface 270, and a memory interface 280.

The processor 210 may communicate with the host 2000 using the host interface 270 and perform a logical operation to control operations of the memory device 100 and the memory controller 200. For example, the processor 210 may load a program command, a data file, a data structure, and the like, and perform various operations or generate the command and the addresses based on a request received from the host 2000 or an external device. For example, the processor 210 may generate various commands required for the program operation, the read operation, the erase operation, a suspend operation, and a parameter setting operation.

The processor 210 may perform a function of a flash translation layer (FTL). The processor 210 may convert the LBA provided by the host 2000 into the PBA through the FTL. That is, the FTL may receive the LBA by using a mapping table and map the LBA to the PBA. There are several address mapping methods of the FTL according to a mapping unit. A representative address mapping method includes a page mapping method, a block mapping method, and a hybrid mapping method.

The processor 210 may generate a command without the request of the host 2000. For example, the processor 210 may generate the command for background operations such as operations for wear leveling of the memory device 100 and operations for garbage collection of the memory device 100.

The RAM 220 may be used as a buffer memory, an operation memory, or a cache memory of the processor 210. The RAM 220 may store codes and commands executed by the processor 210. The RAM 220 may store data processed by the processor 210. In an embodiment, the RAM 220 may be implemented by including a static RAM (SRAM) or a dynamic RAM (DRAM) when implementing the RAM 220.

The error correction circuit 230 may detect an error and correct the detected error during the program operation or the read operation. Specifically, the error correction circuit 230 may perform an error correction operation according to an error correction code (ECC). In an embodiment, the error correction circuit 230 may perform error correction encoding (ECC encoding) on data to be written to the memory device 100. Data on which the error correction encoding is performed may be transferred to the memory device 100 through the memory interface 280. In an embodiment, the error correction circuit 230 may perform error correction decoding (ECC decoding) on data received from the memory device 100 through the memory interface 280.

The ROM 260 may be used as a storage for storing various pieces of information necessary for the operation of the memory controller 200. Specifically, the ROM 260 may include a map table, which may store physical-logical address information and logical-physical address information. In an embodiment, the ROM 260 may be controlled by the processor 210.

The host interface 270 may include a protocol for performing data exchange between the host 2000 and the memory controller 200. Specifically, the host interface 270 may be configured to communicate with the host 2000 through at least one of various communication standards or interfaces such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial-ATA protocol, a parallel-ATA protocol, an SCSI protocol, an enhanced small disk interface (ESDI) protocol, an integrated drive electronics (IDE) protocol, a private protocol, and an SM-BUS (I2C communication).

The memory interface 280 may communicate with the memory device 100 using a communication standard under control of the processor 210. Specifically, the memory interface 280 may communicate the command, the address, and the data with the memory device 100 through a channel. For example, the memory interface 280 may include a NAND interface.

Figure 4:
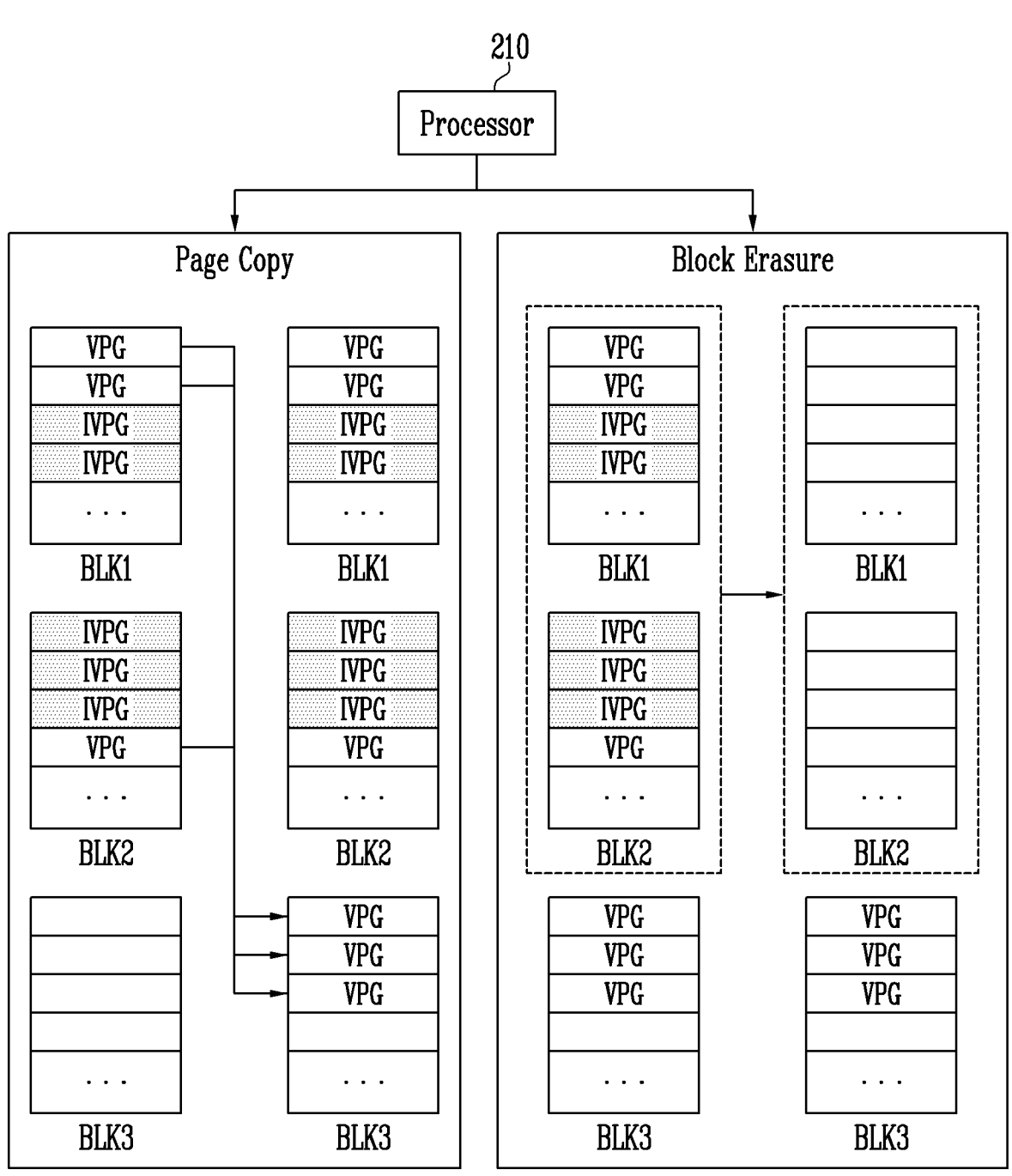
FIG. 4 is a diagram illustrating a garbage collection operation according to an embodiment of the present disclosure.

FIG. 4 is a diagram illustrating a garbage collection operation according to an embodiment of the present disclosure.

Referring to FIG. 4, the processor 210 may control the memory device 100 to perform the garbage collection operation. For example, the garbage collection operation may include a page copy operation, a block erase operation, and an address reset operation.

In an embodiment, the processor 210 may identify a page status (for example, a valid page status or an invalid page status) for each of the plurality of pages included in each of the plurality of memory blocks BLK in the memory device 100 with reference to a valid page table.

The valid page table may include page status information (valid page or not check information) of each of the plurality of pages so that the processor 210 may identify the page status (for example, the valid page status, the invalid page status, and the like) for each of the plurality of pages.

The processor 210 may divide and identify the valid page and the invalid page in each of the memory blocks BLK of the memory device 100, based on the page status information (valid page or not check information) for each of the plurality of pages included in each of the plurality of memory blocks BLK included in the valid page table.

For example, a first memory block BLK1 may include two valid pages VPG and two invalid pages IVPG. A second memory block BLK2 may include one valid page VPG and three invalid pages IVPG. A third memory block BLK3 may be an open block, a good block, or a free block in which data is not stored.

In this case, the processor 210 may control the memory device 100 to perform a page copy operation. For example, the processor 210 may control the memory device 100 to move the two valid pages VPG checked in the first memory block BLK1 to the third memory block BLK3, and control the memory device 100 to move the one valid page VPG checked in the second memory block BLK2 to the third memory block BLK3. The memory device 100 may copy the valid pages VPG included in each of the first memory block BLK1 and the second memory block BLK2 to the third memory block BLK3 under control of the processor 210. In this case, the third memory block BLK3 may include three valid pages VPG.

When the page copy operation is completed, the processor 210 may control the memory device 100 to perform a block erase operation. For example, the processor 210 may perform the block erase operation on the first memory block BLK1 including two invalid pages IVPG corresponding to a third page and a fourth page, and the second memory block BLK2 including three invalid pages IVPG corresponding to the first to third pages.

When the page copy operation or the block erase operation is completed, the processor 210 may perform the address reset operation of resetting addresses of the three valid pages VPG moved to the third memory block BLK3. The processor 210 may normally perform address mapping for the three valid pages VPG moved to the third memory block BLK3.

The garbage collection operation may be performed by the memory device 100 under the control of the processor 210, and may be performed by the FTL in terms of a functional layer.

Figure 5:
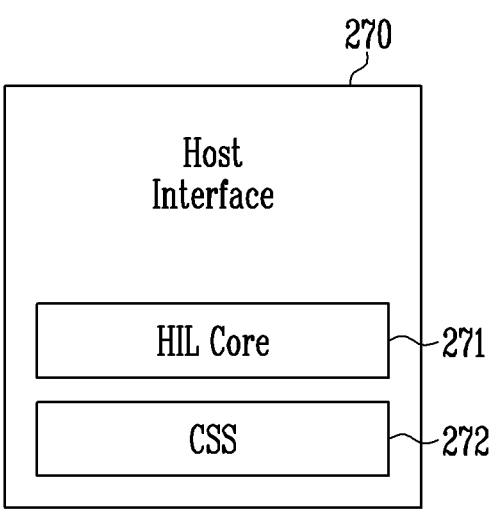
FIG. 5 is a diagram illustrating a host interface according to an embodiment of the present disclosure.

FIG. 5 is a diagram illustrating a host interface 270 according to an embodiment of the present disclosure.

Referring to FIG. 5, the host interface 270 may include an HIL core 271 and a command status scheduler (CSS) 272. The HIL core 271 may drive the HIL and support the command interface operation described with reference to FIG. 2. The command status scheduler 272 may selectively delay a completion response of the command under control of the HIL core 271 and provide, to the host 2000, the completion response to the command.

In an embodiment, the HIL core 271 may determine to delay and transmit a write completion response. The HIL core 271 may check a capacity of a buffer memory (i.e., RAM 220 of FIG. 3) for temporarily storing write data received from the host 2000, and may delay the write completion response based on the check result. In an embodiment, when a capacity of a free buffer indicating that a usable capacity (or a free capacity) of the buffer memory is less than a throttle trigger value, the HIL core 271 may delay the write completion response and transmit the write completion response to the host 2000. In an embodiment, the HIL core 271 may determine a delay time of the write completion response.

The HIL core 271 may check an active range by referring to mapping data managed by the processor 210 and determine the throttle trigger value based on the active range. In an embodiment, the active range may mean a ratio of an area used in a user data area. In an embodiment, the user data area may correspond to a part or all of storage area of the memory device 100. For example, in a case where the active range is 80%, the case may mean that 80% of the user data area for storing user data is already allocated or data is stored. For example, when the user data area is 100 GB and an area where data is stored or an already allocated area is 80 GB, the active range may be 80%. In an embodiment, the active range may be a ratio of allocated addresses among total addresses for the user data area of the memory device 100. The HIL core 271 may check the active range through a ratio of a currently mapped area to an area where the user data may be stored. The HIL core 271 may identify a status in which the LBA and the PBA are mapped using the mapping data. In an embodiment, the mapping data may include data included in a physical to logical (P2L) table or a logical to physical (L2P) table, and the HIL core 271 may identify the ratio of the area where the data is stored or the already allocated area among the entire user data area, using the P2L table or the L2P table.

As described above, the memory device 100 may include areas including the plurality of memory blocks. In an embodiment, when the write request is received from the host 2000, while the memory device 100 performs a garbage collection operation of securing a storage space in specific areas, the HIL core 271 may check the active range based on the ratio of the allocated area to the entire user data area. In an embodiment, the entire user data area may be an area of the memory device 100 allocated (or defined) to store user data. The allocated area may be an area currently storing user data among the entire user data area. The HIL core 271 may check the active range through the ratio of the currently mapped area to the area where the user data may be stored.

The HIL core 271 may check a write ratio, which is a ratio occupied by the write command among the commands received from the host 2000, and determine a base latency based on the write ratio.

In an embodiment, the HIL core 271 may determine the delay time of the write completion response based on the base latency and the throttle trigger value of the storage device 1000. According to an embodiment, the HIL core 271 may determine the delay time of the write completion response to be longer as the usable capacity of the buffer memory is less. According to an embodiment, the HIL core 271 may determine the delay time of the write completion response to be longer as the amount of the command which is received from the host 2000 but not processed by the processor 210 increases.

In an embodiment, the HIL core 271 may determine the delay time of the write completion response using Equation 1 below.

$$T = (BM_{tt} - BM_{free}) \times BL \times W\_QD \div BM_{tt} \times c \qquad \text{[Equation 1]}$$

Here, $BM_{tt}$ is the throttle trigger value according to the active range, $BM_{free}$ is the free capacity of the buffer memory, BL is the base latency according to the write ratio, W_QD is the amount of the command which is not processed by the processor 210, and c is a calibration constant.

The command status scheduler 272 may delay the write completion response by the delay time according to the delay time determined by the HIL core 271 and then provide the write completion response to the host 2000.

Figure 6:
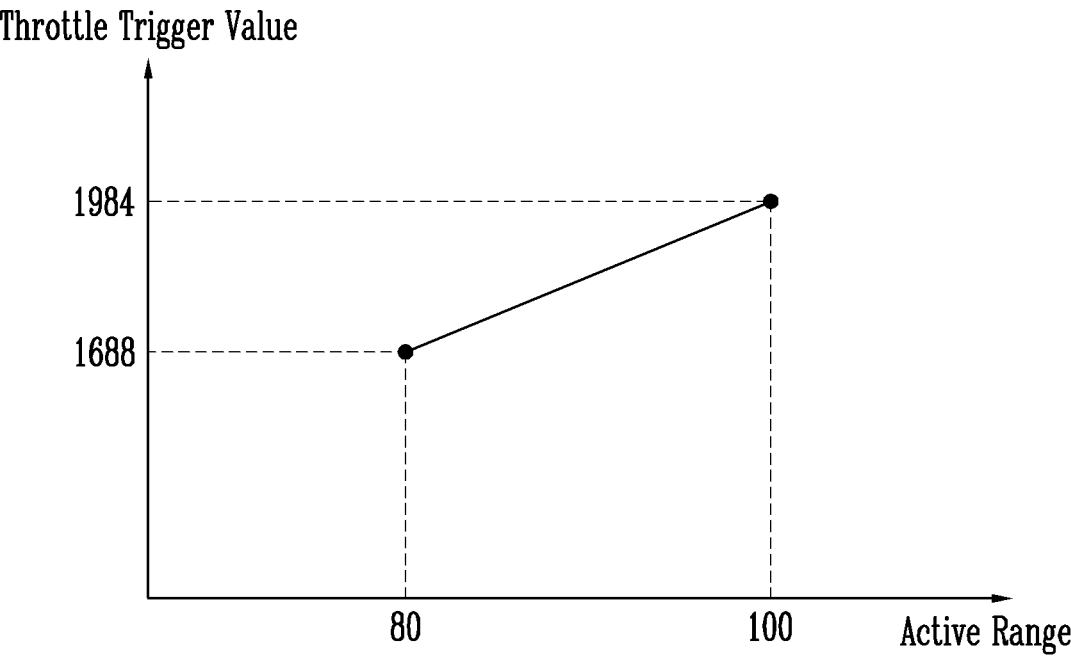
FIG. 6 is a diagram illustrating a throttle trigger value according to an embodiment of the present disclosure.

FIG. 6 is a diagram illustrating a throttle trigger value according to an embodiment of the present disclosure.

Referring to FIG. 6, a graph illustrates a relationship between the active range and the throttle trigger value. In FIG. 6, an x-axis may represent the active range, and the y-axis may represent the throttle trigger value.

The throttle trigger value may be a threshold value determined according to operation status (for example, the active range) of the memory device 100 and the memory controller 200. The storage device 1000 may determine whether to perform a write throttle operation of delaying the write completion response according to the throttle trigger value. That is, the storage device 1000 may perform the write throttle operation according to the throttle trigger value.

In an embodiment, the throttle trigger value may be a value determined by considering the amount of the command which is not processed by the processor 210, a processing speed of the command (the number of FTL cores), and the like, based on the active range. The throttle trigger value may be a value for determining whether to perform the write throttle operation by comparing the capacity of the free buffer with the throttle trigger value. In an embodiment, the throttle trigger value may be calculated in the same unit as a unit indicating the capacity of the buffer memory.

The throttle trigger value may be determined based on linear interpolation of a first throttle trigger value when the active range is a first value and a second throttle trigger value when the active range is a second value. For example, the relationship between the active range and the throttle trigger value may be indicated by using a throttle trigger value of 1688 when the active range is 80% and a throttle trigger value of 1984 when the active range is 100%. That is, when the throttle trigger value changes linearly, the relationship between the active range and the throttle trigger value may be expressed by Equation 2 below.

$$f1(x)=((BM_{100\%}-BM_{80\%})\times x\div(100-80)+C1 \qquad \text{[Equation 2]}$$

Here, f1(x) is a linear function. An x-axis of f1(x) corresponds to the active range (e.g., 80%, 100%). A y-axis of f1(x) corresponds to the throttle trigger value (e.g., $BM_{80\%}$, $BM_{100\%}$). $BM_{100\%}$ may be the throttle trigger value when the active range is 100%. $BM_{80\%}$ may be the throttle trigger value when the active range is 80%. C1 is a constant. For example, C1 may be calculated by an equation of a straight line connecting two points on xy plane. The two points may be (80, $BM_{80\%}$) and (100, $BM_{100\%}$).

In an embodiment, a case where the active range is 80% and a case where the active range is 100% may be an active range used in a main workload. In an embodiment, the active range may refer to an area that is actually allocated or written while performing a workload of the host 2000. In an embodiment, the workload may be a series of patterns or processes in which the host 2000 requests input/output (I/O) of data to the storage device 1000.

Figure 7:
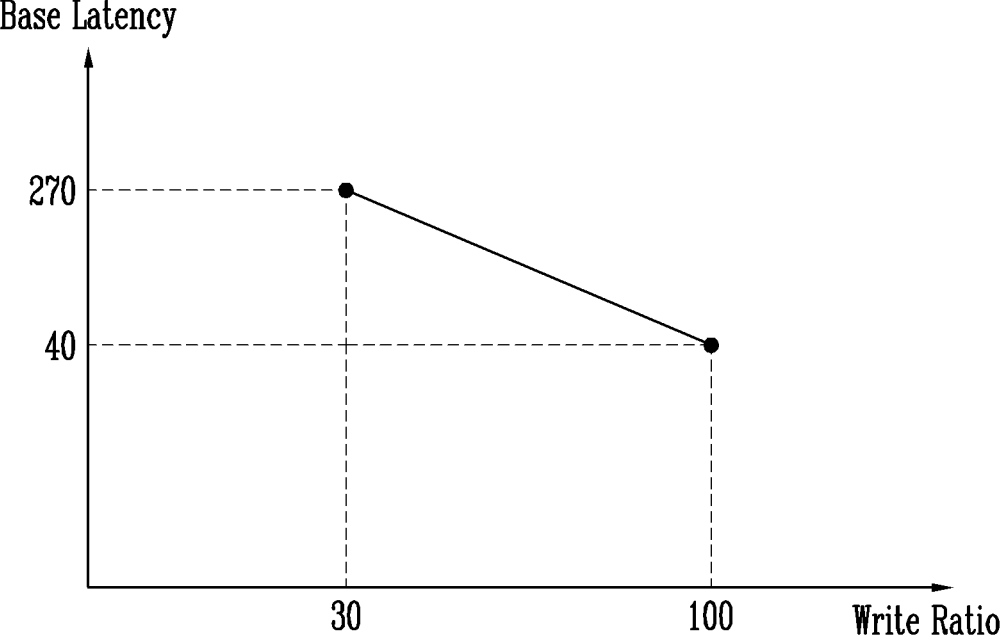
FIG. 7 is a diagram illustrating a base latency according to an embodiment of the present disclosure.

FIG. 7 is a diagram illustrating a base latency according to an embodiment of the present disclosure.

Referring to FIG. 7, a graph illustrates a relationship between the write ratio and the base latency. In FIG. 7, an x-axis may represent the write ratio, and a y-axis may represent the base latency.

In an embodiment, the write ratio may mean a ratio occupied by the write command among recently fetched commands. Alternatively, the write ratio may mean a ratio occupied by the write command among a predetermined number of commands. For example, the write ratio may be the ratio occupied by the write command among the commands received from the host 2000. In an embodiment, the base latency may be a value determined according to operation states (for example, workload, the write ratio, and the like) of the memory device 100 and the memory controller 200. For example, the base latency may be a constant determined according to the write ratio. For another example, the base latency may be a weight for determining the delay time of the write completion response.

The base latency may be determined based on linear interpolation of a first latency when the write ratio is a first value and a second latency when the write ratio is a second value. For example, the relationship between the write ratio and the base latency may be indicated by using a base latency of 40 when the write ratio is 100% and a base latency of 270 when the write ratio is 30%. That is, when the base latency changes linearly, the relationship between the write ratio and the base latency may be expressed by Equation 3 below.

$$f2(x)=C2-((BL_{30\%}-BL_{100\%})\times x\div(100-30)) \qquad \text{[Equation 3]}$$

Here, f2(x) is a linear function. An x-axis of f2(x) corresponds to the write ratio (e.g., 30%, 100%). A y-axis of f2(x) corresponds to the base latency (e.g., $BL_{30\%}$, $BL_{100\%}$). $BL_{100\%}$ may be the base latency when the write ratio is 100%. $BL_{30\%}$ may be the base latency when the write ratio is 30%. C2 is a constant. For example, C2 may be calculated by an equation of a straight line connecting two points on xy plane. The two points may be (30, $BL_{30\%}$) and (100, $BL_{100\%}$).

According to an embodiment of the present disclosure, the memory controller 200 determines the throttle trigger value according to the active range of the storage device 1000, and the memory controller 200 may determine the base latency according to the write ratio of the storage device 1000.

In an embodiment, the memory controller 200 may determine the delay time of the write completion response optimized for the storage device 1000 by using the throttle trigger value and the base latency determined according to a status of the storage device 1000.

Figure 8:
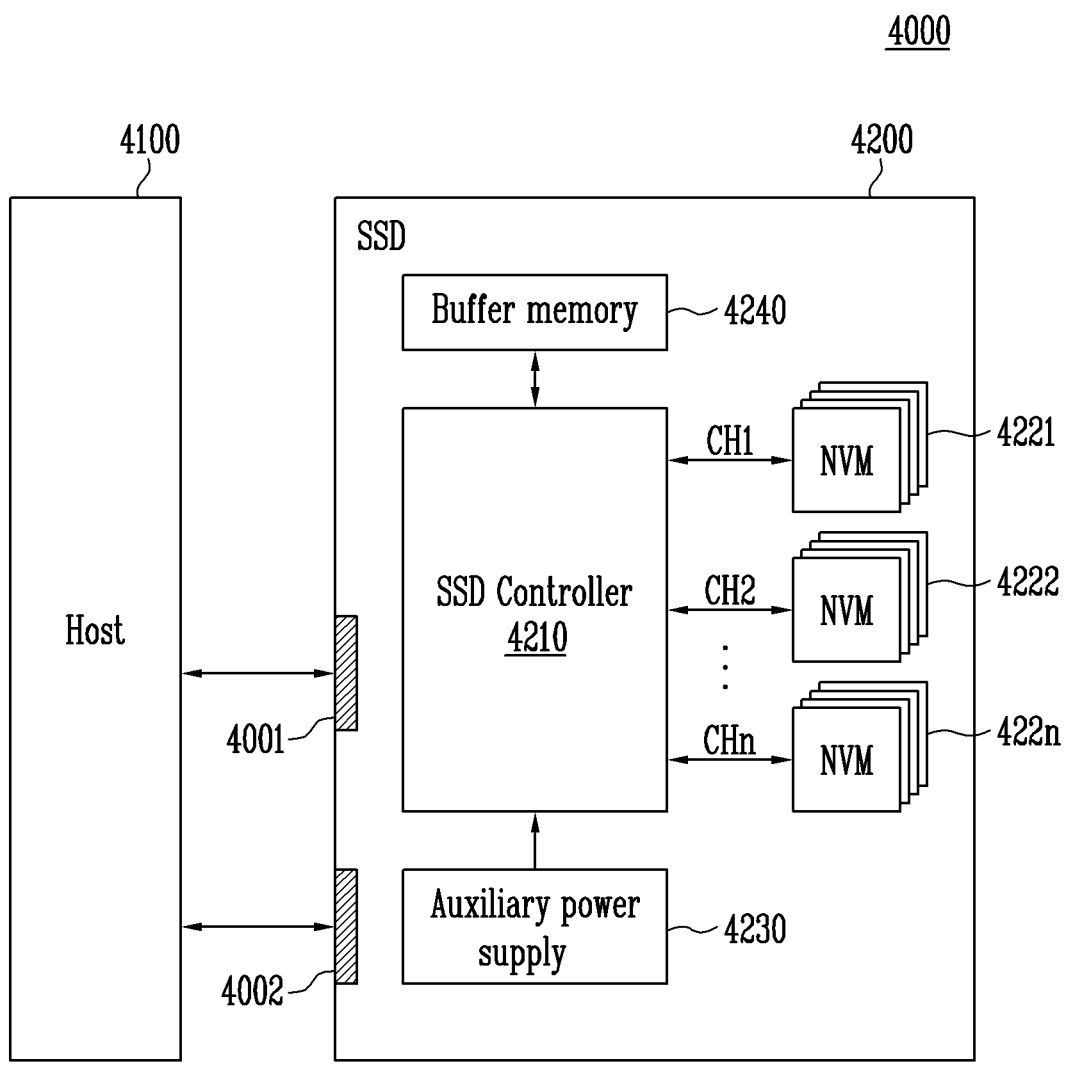
FIG. 8 is a diagram illustrating a solid state drive (SSD) system according to an embodiment of the present disclosure.

FIG. 8 is a diagram illustrating a solid state drive (SSD) system 4000 according to an embodiment of the present disclosure.

Referring to FIG. 8, the SSD system 4000 may include a host 4100 and an SSD 4200. The SSD 4200 may exchange a signal SIG with the host 4100 through a signal connector 4001 and receive power PWR through a power connector 4002. The SSD 4200 may include an SSD controller 4210, a plurality of flash memories 4221 to 422n, an auxiliary power supply 4230, and a buffer memory 4240.

In an embodiment, the SSD controller 4210 may perform a function of the memory controller 200 described with reference to FIG. 1. The SSD controller 4210 may control the plurality of flash memories 4221 to 422n in response to the signal SIG received from the host 4100. For example, the signal SIG may be signals based on an interface between the host 4100 and the SSD 4200. For example, the signal SIG may be a signal defined by at least one of communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, an SCSI, an enhanced small disk interface (ESDI), integrated drive electronics (IDE), FireWire, a universal flash storage (UFS), Wi-Fi, Bluetooth, and an NVMe.

The auxiliary power supply 4230 may be connected to the host 4100 through the power connector 4002. The auxiliary power supply 4230 may receive the power PWR from the host 4100 and may charge the power. The auxiliary power supply 4230 may provide power of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store metadata (for example, a mapping table) of the flash memories 4221 to 422n. The buffer memory 4240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

The above description is merely intended to illustratively describe the technical spirit of the present disclosure, and various changes and modifications can be made by those skilled in the art to which the present disclosure pertains without departing from the essential features of the present disclosure. Therefore, the embodiments disclosed in the present disclosure are not intended to limit the technical spirit of the present disclosure, but are intended to describe the present disclosure. The scope of the technical spirit of the present disclosure is not limited by these embodiments. The scope of the present disclosure should be interpreted by the accompanying following claims and all technical spirits falling within the equivalent scope thereto should be interpreted as being included in the scope of the present disclosure. Furthermore, the embodiments may be combined to form additional embodiments.

What is claimed is:

1. A memory controller comprising:
a buffer memory configured to store user data and a write command corresponding to a write request received from a host;
a processor configured to control a memory device to perform a write operation corresponding to the write command; and
a host interface configured to:
determine an active range based on mapping information of the memory device,
determine a throttle trigger value based on the active range,
determine a base latency based on a write ratio of the write command to commands received from the host,
determine a delay time of a write completion response based on the throttle trigger value and the base latency,
delay the write completion response according to the delay time, and
transmit the delayed write completion response to the host.

2. The memory controller of claim 1, wherein the host interface determines the delay time of the write completion response by further considering a free capacity of the buffer memory.

3. The memory controller of claim 1, wherein the host interface determines the delay time of the write completion response by further considering an amount of one or more commands which are received from the host but not processed by the processor.

4. The memory controller of claim 1, wherein the host interface determines the delay time of the write completion response based on Equation 1 below, $$T = (BM_{tt} - BM_{free}) \times BL \times \text{W\_QD} \div BM_{tt} \times c, \qquad \text{[Equation 1]}$$

where T is the delay time, $BM_{tt}$ is the throttle trigger value according to the active range, $BM_{free}$ is a free capacity of the buffer memory, BL is the base latency according to the write ratio, $\text{W\_QD}$ is an amount of one or more commands which are not processed by the processor, and c is a calibration constant.

5. The memory controller of claim 1, wherein the processor controls the memory device to perform a garbage collection operation on a plurality of memory blocks included in the memory device.

6. The memory controller of claim 5, wherein the host interface determines the active range based on a ratio of an area where user data is currently stored to total user data area, when receiving the write request from the host while performing the garbage collection operation.

7. The memory controller of claim 1, wherein the host interface determines the throttle trigger value based on linear interpolation of a first throttle trigger value when the active range is a first value and a second throttle trigger value when the active range is a second value.

8. The memory controller of claim 1, wherein the host interface determines the base latency based on linear interpolation of a first latency when the write ratio is a first value and a second latency when the write ratio is a second value.

9. The memory controller of claim 1, wherein the host interface comprises:
a host interface layer (HIL) core configured to determine the delay time of the write completion response; and
a command status scheduler configured to delay the write completion response according to the delay time and provide the delayed write completion response to the host.

10. A storage device comprising:
a memory device including a plurality of memory blocks;
a buffer memory configured to store user data and a write command corresponding to a write request received from a host; and
a memory controller configured to:
control the memory device to perform a write operation corresponding to the write command,
determine an active range based on mapping data,
determine a throttle trigger value based on the active range,
determine a base latency based on a write ratio of the write command to commands received from the host,
determine a delay time of a write completion response based on the throttle trigger value and the base latency,
delay the write completion response according to the delay time, and transmit the delayed write completion response to the host.

11. The storage device of claim 10, wherein the memory controller determines the delay time of the write completion response by further considering a free capacity of the buffer memory.

12. The storage device of claim 10, wherein the memory controller determines the delay time of the write completion response by further considering an amount of one or more commands which are received from the host but not processed by the memory controller.

13. The storage device of claim 10, wherein the memory controller determines the delay time of the write completion response based on Equation 1 below, $$T = (BM_{tt} - BM_{free}) \times BL \times W\_QD \div BM_{tt} \times c, \qquad \text{[Equation 1]}$$

where T is the delay time, BMtt is the throttle trigger value according to the active range, BMfree is a free capacity of the buffer memory, BL is the base latency according to the write ratio, W_QD is an amount of one or more commands which are not processed by the processor, and c is a calibration constant.

14. The storage device of claim 10, wherein the memory controller controls the memory device to perform a garbage collection operation on the plurality of memory blocks.

15. The storage device of claim 14, wherein the memory controller determines the active range based on a ratio of an area where user data is currently stored to total user data area when receiving the write request from the host while performing the garbage collection operation.

16. The storage device of claim 10, wherein the memory controller determines the throttle trigger value based on linear interpolation of a first throttle trigger value when the active range is a first value and a second throttle trigger value when the active range is a second value.

17. The storage device of claim 10, wherein the memory controller determines the base latency based on linear interpolation of a first latency when the write ratio is a first value and a second latency when the write ratio is a second value.

18. The storage device of claim 10, wherein the memory controller comprises:

a host interface layer (HIL) core configured to determine the delay time of the write completion response; and a command status scheduler configured to delay write completion response by the delay time and provide the delayed write completion response to the host.

19. A storage device comprising:

a memory device; and a memory controller including a buffer memory and configured to:

perform a write operation on the memory device in response to a write request from a host; and transmit, to the host, a write completion response responsive to the write request at a particular time, wherein the particular time is determined based on a throttle trigger value and a base latency, wherein the throttle trigger value is determined based on an active range with reference to mapping data associated with the write operation, and wherein the base latency is determined based on a write ratio of the write command to commands received from the host.

* * * * *